United States Patent
Buckmeier et al.

(10) Patent No.: US 10,196,215 B2
(45) Date of Patent: Feb. 5, 2019

(54) SWING AWAY CONVEYOR

(71) Applicant: Norwood Sales, Inc., Horace, ND (US)

(72) Inventors: Michael C Buckmeier, Moorhead, MN (US); Dan Norwood, Fargo, ND (US)

(73) Assignee: Norwood Sales, Inc., Horace, ND (US)

( * ) Notice: Subject to any disclaimer, the term of this patent is extended or adjusted under 35 U.S.C. 154(b) by 0 days.

(21) Appl. No.: 15/600,223

(22) Filed: May 19, 2017

(65) Prior Publication Data

US 2017/0334650 A1 Nov. 23, 2017

Related U.S. Application Data

(60) Provisional application No. 62/339,574, filed on May 20, 2016.

(51) Int. Cl.
*B65G 41/00* (2006.01)
*B65G 47/34* (2006.01)

(52) U.S. Cl.
CPC ......... *B65G 41/008* (2013.01); *B65G 41/002* (2013.01)

(58) Field of Classification Search
None
See application file for complete search history.

(56) References Cited

U.S. PATENT DOCUMENTS

| 4,983,280 A * | 1/1991 | Eriksson | B07B 1/005 209/241 |
| 5,404,993 A * | 4/1995 | Scarrow | B65G 33/24 198/311 |
| 6,688,450 B2 * | 2/2004 | Speers | B65G 41/005 198/303 |
| 8,991,585 B2 * | 3/2015 | Mast | B65G 67/24 198/311 |
| 2014/0086721 A1 | 3/2014 | Wehrle et al. | |

* cited by examiner

*Primary Examiner* — Kavel Singh
(74) *Attorney, Agent, or Firm* — Duft & Bornsen, PC

(57) ABSTRACT

A swing conveyor that is segmented. In one embodiment, the swing conveyor comprises an incline section that pivotally connects to an intake of a main conveyor, and includes a first belt. The swing conveyor further comprises an intake section that receives a flow of material via a second belt, and transfers the flow of material to the incline section. The first belt of the incline section transfers the flow of material received from the intake section to the intake of the main conveyor. The intake section connects to the incline section via a hinge mechanism so that the intake section pivots in relation to the incline section.

20 Claims, 12 Drawing Sheets

SWING AWAY CONVEYOR

RELATED APPLICATIONS

This non-provisional application claims priority to U.S. provisional application 62/339,574, filed on May 20, 2016, which is incorporated herein by reference as if fully provided herein.

FIELD

This disclosure relates to the field of agricultural products, and more particularly, to conveyor systems.

BACKGROUND

A grain auger is used in agriculture to move a material or product, such as grain, from trucks, trailers, grain carts, etc., to a storage bin. A typical auger includes a long tube that is inclined, with a hopper at the lower, inlet end and a spout at the elevated, output end. A fighting rotates within the tube, which moves the material from the hopper and out of the spout. In some applications, augers may damage the material being transferred, such as cracking seeds. Thus, a conveyor may be used instead of an auger. A conveyor uses a continuous belt to move the material, which is gentler in moving the material than a typical flighting of an auger.

One type of conveyor uses a short intake conveyor, which is referred to as a swing conveyor. A typical swing conveyor includes a short tube, with one end of the tube pivotally attached to the inlet end of the "main" conveyor, and a hopper on the other end of the tube. The swing conveyor is used to "swing" underneath the discharge outlet of a hopper-bottom trailer or truck, and transfer the material to the main conveyor.

When a truck or trailer is parked next to a conveyor for unloading, there may not be sufficient space to rotate the swing conveyor underneath the truck or trailer without contacting tires, mud flaps, jacks, etc. Unfortunately, a user may need to position the truck/trailer or the conveyor to create ample space for the swing conveyor, and then reposition the truck/trailer or the conveyor again to align the hopper of the swing conveyor with the discharge outlet of the truck/trailer.

SUMMARY

Embodiments described herein provide for an improved swing conveyor of a conveyor apparatus. Instead of being a single tube as with prior swing conveyers, a swing conveyor as described herein is segmented into sections or modules that are able to fold with respect to one another. The swing conveyor as described herein may be folded when a truck or trailer is parked next to the conveyor apparatus for unloading. The swing conveyor may then be pivoted under the truck/trailer, and unfolded to align an intake area of the swing conveyor with a discharge outlet for the truck/trailer. Because the swing conveyor is segmented and capable of being folded, the swing radius of the swing conveyor is reduced when being pivoted underneath a truck/trailer so that the swing conveyor does not contact tires, mud flaps, jacks, or other portions of the truck/trailer. When pivoted underneath the truck/trailer, the swing conveyor may be unfolded, which extends the length of the swing conveyor so that the intake area of the swing conveyor is able to reach one or more discharge outlets of the truck/trailer. This advantageously avoids situations where a user needs to continually reposition the conveyor apparatus or the truck/trailer.

One embodiment comprises a conveyor apparatus that includes a swing conveyor. The swing conveyor comprises an incline section that pivotally connects to an intake of a main conveyor, and includes a first belt. The swing conveyor also comprises an intake section that receives a flow of material via a second belt, and transfers the flow of material to the incline section. The first belt of the incline section transfers the flow of material received from the intake section to the intake of the main conveyor. The intake section connects to the incline section via a hinge mechanism so that the intake section pivots in relation to the incline section.

In another embodiment, the swing conveyor comprises a hinge actuator connected between the incline section and the intake section. The hinge actuator is configured to pivot the intake section toward the incline section via the hinge mechanism to fold the swing conveyor. The hinge actuator is configured to pivot the intake section away from the incline section via the hinge mechanism to unfold the swing conveyor.

In another embodiment, the swing conveyor comprises a locking mechanism that secures the intake section to the incline section when the swing conveyor is unfolded.

In another embodiment, the intake section comprises collapsible walls that border an intake area where the intake section receives the flow of material via the second belt.

Another embodiment comprises a swing conveyor that comprises an incline section that includes a first belt configured to rotate in a loop between an inlet end and an outlet end. The outlet end of the incline section pivotally connects to an intake of a main conveyor so that the swing conveyor pivots about a first axis in relation to the main conveyor. The swing conveyor further comprises an intake section that includes a second belt configured to rotate in a loop between an outer end and a transition end. At least a portion of the second belt is exposed to form an intake area of the swing conveyor. The swing conveyor further comprises a hinge mechanism that connects the transition end of the intake section to the inlet end of the incline section so that the intake section pivots about a second axis in relation to the incline section.

In another embodiment, the swing conveyor comprises a hinge actuator connected between the incline section and the intake section. The hinge actuator is configured to pivot the intake section toward the incline section via the hinge mechanism to fold the swing conveyor. The hinge actuator is configured to pivot the intake section away from the incline section via the hinge mechanism to unfold the swing conveyor.

In another embodiment, the swing conveyor comprises a locking mechanism that secures the intake section to the incline section when the swing conveyor is unfolded.

In another embodiment, the intake section includes a first actuator configured to drive the second belt from the outer end, and the incline section includes a second actuator configured to drive the first belt from the outlet end.

In another embodiment, the hinge mechanism connects to the incline section via a pivot shaft. The pivot shaft allows the hinge mechanism and the intake section to pivot about a third axis in relation to the incline section.

In another embodiment, the second belt at the transition end of the intake section is elevated in relation to the first belt at the inlet end of the incline section.

In another embodiment, the incline section includes a ground drive mechanism toward the inlet end that engages the ground. The intake section includes one or more wheels toward the outer end that engage the ground.

In another embodiment, the ground drive mechanism includes one or more wheels that engage the ground, and an actuator configured to drive the one or more wheels of the ground drive mechanism.

In another embodiment, the intake section includes collapsible walls that border the intake area of the swing conveyor.

Another embodiment comprises a conveyor apparatus comprising a main conveyor and a swing conveyor. The main conveyor has an intake and a discharge. The swing conveyor comprises an incline section that includes an inlet end, an outlet end that pivotally connects to the intake of the main conveyor so that the swing conveyor pivots about a first axis in relation to the main conveyor, and a first belt configured to rotate in a loop between the inlet end and the outlet end. The swing conveyor further comprises an intake section that includes an outer end, a transition end that connects to the inlet end of the incline section via a hinge mechanism so that the intake section pivots about a second axis in relation to the incline section, and a second belt configured to rotate in a loop between the outer end and the transition end. At least a portion of the second belt is exposed to form an intake area of the swing conveyor.

In another embodiment, the swing conveyor comprises a hinge actuator connected between the incline section and the intake section. The hinge actuator is configured to pivot the intake section toward the incline section via the hinge mechanism to fold the swing conveyor. The hinge actuator is configured to pivot the intake section away from the incline section via the hinge mechanism to unfold the swing conveyor.

In another embodiment, the swing conveyor comprises a locking mechanism that secures the intake section to the incline section when the swing conveyor is unfolded.

In another embodiment, the intake section includes a first actuator configured to drive the second belt from the outer end, and the incline section includes a second actuator configured to drive the first belt from the outlet end.

In another embodiment, the hinge mechanism connects to the incline section via a pivot shaft. The pivot shaft allows the hinge mechanism and the intake section to pivot about a third axis in relation to the incline section.

In another embodiment, the incline section includes a ground drive mechanism toward the inlet end that engages the ground. The intake section includes one or more wheels toward the outer end that engage the ground.

In another embodiment, the intake section includes collapsible walls that border the intake area of the swing conveyor.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
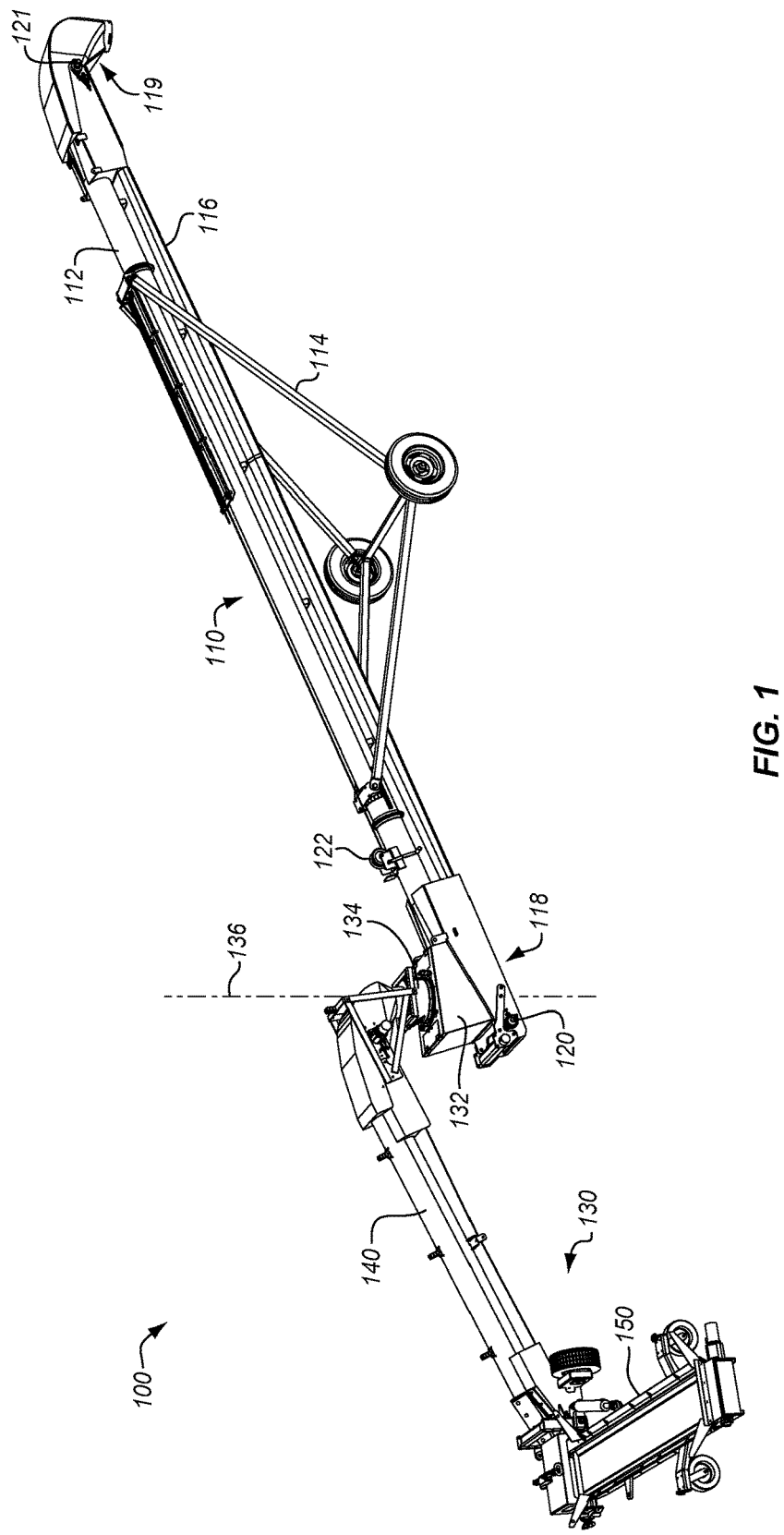
FIG. 1 illustrates a conveyor apparatus in an exemplary embodiment.

FIG. 1 illustrates a conveyor apparatus 100 in an exemplary embodiment. Conveyor apparatus 100 comprises an agricultural or farm implement that conveys a material or product, such as grain, from ground level to an elevated position, such as the top inlet of a storage bin (not shown). Conveyor apparatus 100 includes a main conveyor 110 and a swing conveyor 130. As described in more detail below, swing conveyor 130 is segmented into sections so that it is able to fold.

In the example shown in FIG. 1, main conveyor 110 includes a housing 112 mounted on a wheeled undercarriage 114. Housing 112 includes an enclosed structure, such as a hollow tube, for transferring a material on a belt 116. The diameter and length of housing 112 may vary as desired. For example, housing 112 may have a 10 inch diameter, and may have a length of 60 feet, 70 feet, 85 feet, etc. Belt 116 is a continuous belt that rotates in a loop through housing 112 between an inlet end 118 and an outlet end 119. Inlet end 118 represents the intake of main conveyor 110 where it receives a flow of material (e.g., grain) from swing conveyor 130, and outlet end 119 represents the outlet or discharge of main conveyor 110 where it discharges the flow of material, such as into a storage bin. Belt 116 runs between a pulley 120 at the inlet end 118 through housing 112 to a pulley 121 at the outlet end 119, and returns back to pulley 120 on the bottom side of main conveyor 110. The characteristics of belt 116 may vary as desired. For example, belt 116 may have a width of 15 inches, may have a tread of 10 inches, 12 inches, etc., may be made from PVC or rubber, etc. Belt 116 may be driven by an electric motor, a hydraulic motor, a Power Take-Off (PTO), etc. Main conveyor 110 also includes an adjustment mechanism 122 that is able to adjust the angle of housing 112 in relation to the ground. The structure of main conveyor 110 provided above is just an example, and swing conveyor 130 as described below may be used with other main conveyors.

Swing conveyor 130 is attached to the inlet end 118 of main conveyor 110 through a transition chamber 132. Transition chamber 132 represents a chamber where main conveyor 110 receives the flow of material from swing conveyor 130. Transition chamber 132 includes a pivot mechanism 134 that allows swing conveyor 130 to rotate or pivot about an axis 136 in relation to main conveyor 110, which is substantially vertical. In this embodiment, swing conveyor 130 is segmented into sections so that it may be folded. Swing conveyor 130 includes an incline section 140 and an intake section 150. Intake section 150 is oriented substantially horizontal or parallel to the ground to receive a flow of material (e.g., grain) from a truck, trailer, etc. Incline section 140 is oriented at an angle to the ground to convey material received from intake section 150 to the intake of main conveyor 110.

Figure 2:
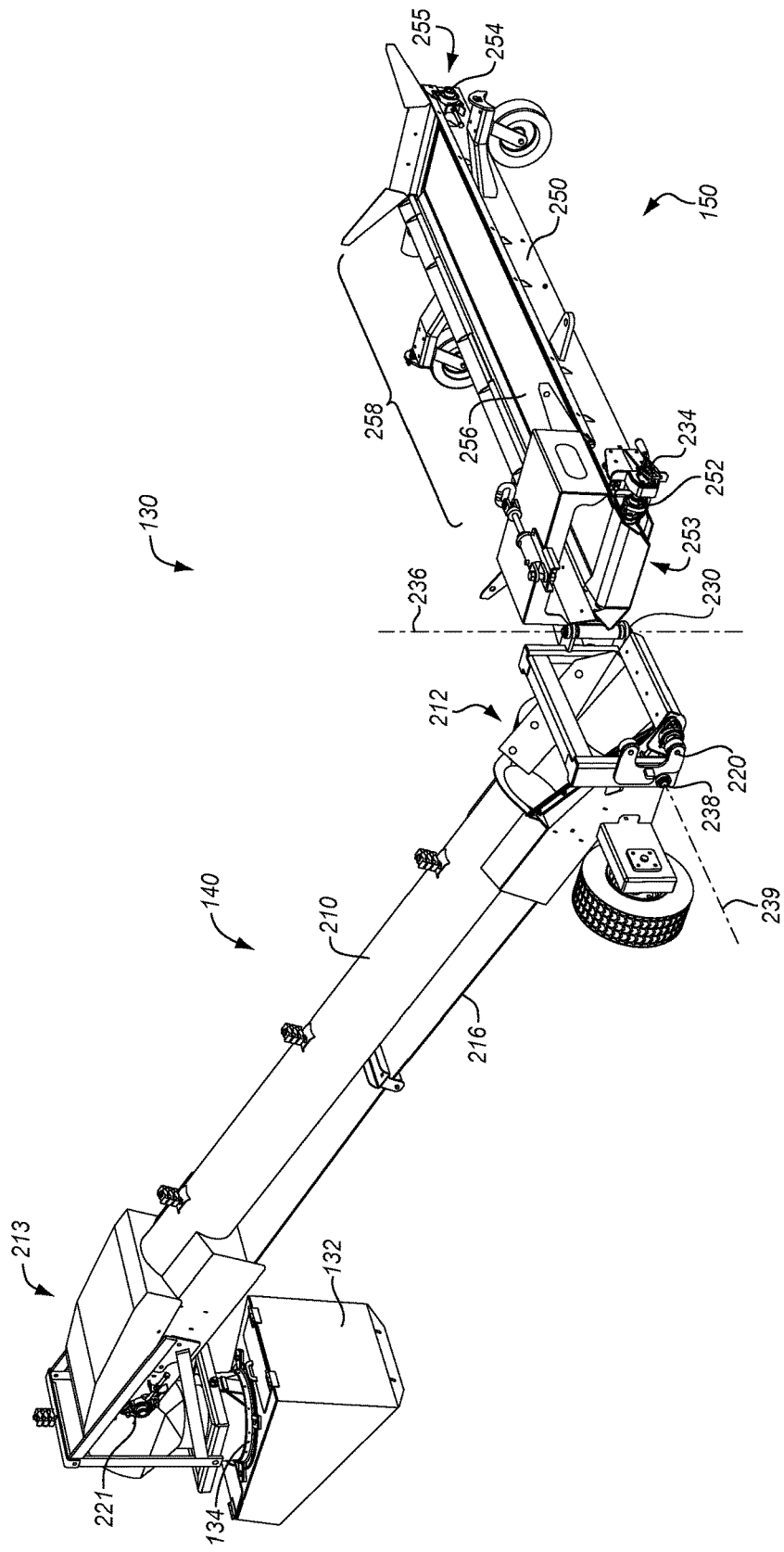
FIG. 2 is an isometric view of a swing conveyor in an exemplary embodiment.

FIG. 2 is an isometric view of swing conveyor 130 in an exemplary embodiment. In this embodiment, incline section 140 includes a housing 210 having an inlet end 212 and an outlet end 213. Inlet end 212 represents the intake of incline section 140 where it receives a flow of material from intake section 150, and outlet end 213 represents the outlet or discharge of incline section 140 where it discharges the flow of material into transition chamber 132. Housing 210 may include an enclosed structure, such as a hollow tube, for transferring a material on a belt 216. Belt 216 comprises a continuous belt that rotates in a loop through housing 210 between the inlet end 212 and the outlet end 213. Belt 216 runs between a pulley 220 at the inlet end 212 through housing 210 to a pulley 221 at the outlet end 213, and returns back to pulley 220 on the bottom side of incline section 140. The outlet end 213 of incline section 140 connects to pivot mechanism 134.

Figure 3:
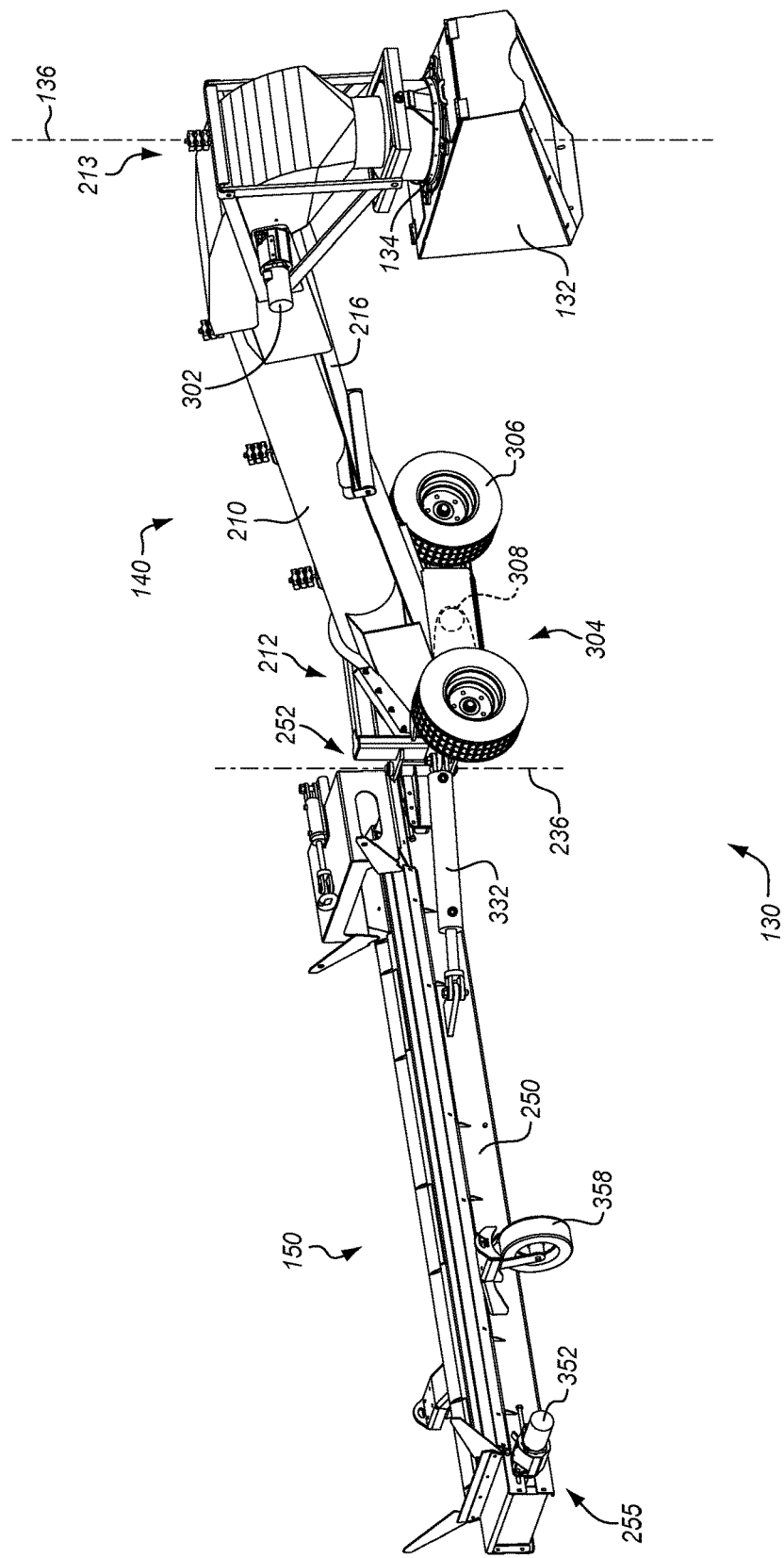
FIG. 3 is another isometric view of a swing conveyor in an exemplary embodiment.

FIG. 3 is another isometric view of swing conveyor 130 in an exemplary embodiment. Incline section 140 may also include an actuator 302 that is configured to drive pulley 221 (not visible in FIG. 3). Actuator 302 may therefore control the speed at which belt 216 is driven for incline section 140. Incline section 140 may also include a ground drive mechanism 304 toward inlet end 212, which means that ground drive mechanism 304 attaches to housing 210 or a frame of housing 210 near, proximate, or at inlet end 212. Ground drive mechanism 304 includes one or more wheels 306 that engage the ground, and an actuator 308 configured to drive one or more of wheels 306 via a belt, chain, etc. When wheels 306 are driven counterclockwise by actuator 308, swing conveyor 130 will rotate about axis 136 in one direction. When wheels 306 are driven clockwise by actuator 308, swing conveyor 130 will rotate about axis 136 in the other direction. Actuators 302 and 308 comprise any component for imparting motion, such as electric motors, hydraulic motors, etc.

In FIG. 2, intake section 150 includes a housing 250 for transferring a material on a belt 256. Belt 256 comprises a continuous belt that rotates in a loop through housing 250 between an outer end 255 and a transition end 253 (i.e., the end where material transitions from intake section 150 to incline section 140). Outer end 255 represents the distal end of intake section 150 from incline section 140, and transition end 253 represents the outlet or discharge of intake section 150 where it discharges the flow of material to incline section 140. Belt 256 runs between a pulley 254 at the outer end 255 through housing 250 to a pulley 252 at the transition end 253, and returns back to pulley 254 on the bottom side of intake section 150. Intake section 150 is configured to receive a flow of material (e.g., grain) from a truck or trailer. Thus, at least a portion of housing 250 (i.e., the top) is open so that belt 256 is exposed, and is referred to as the intake area 258 of intake section 150.

Swing conveyor 130 also includes a hinge mechanism 230 that connects the inlet end 212 of incline section 140 to the transition end 253 of intake section 150. Hinge mechanism 230 comprises any connecting joint that allows intake section 150 to swing in relation to incline section 140. Due to hinge mechanism 230, intake section 150 is able to pivot about an axis 236 (i.e., a substantially vertical axis) in relation to incline section 140 between a folded position and an unfolded position. Hinge mechanism 230 may connect to incline section 140 via a pivot shaft 238. Pivot shaft 238 allows hinge mechanism 230 and intake section 150 to pivot about an axis 239 (substantially horizontal) in relation to incline section 140 so that swing conveyor 130 can be used on uneven ground. Swing conveyor 130 may also include a locking mechanism 234 that secures intake section 150 to incline section 140 when swing conveyor 130 is unfolded.

Figure 4:
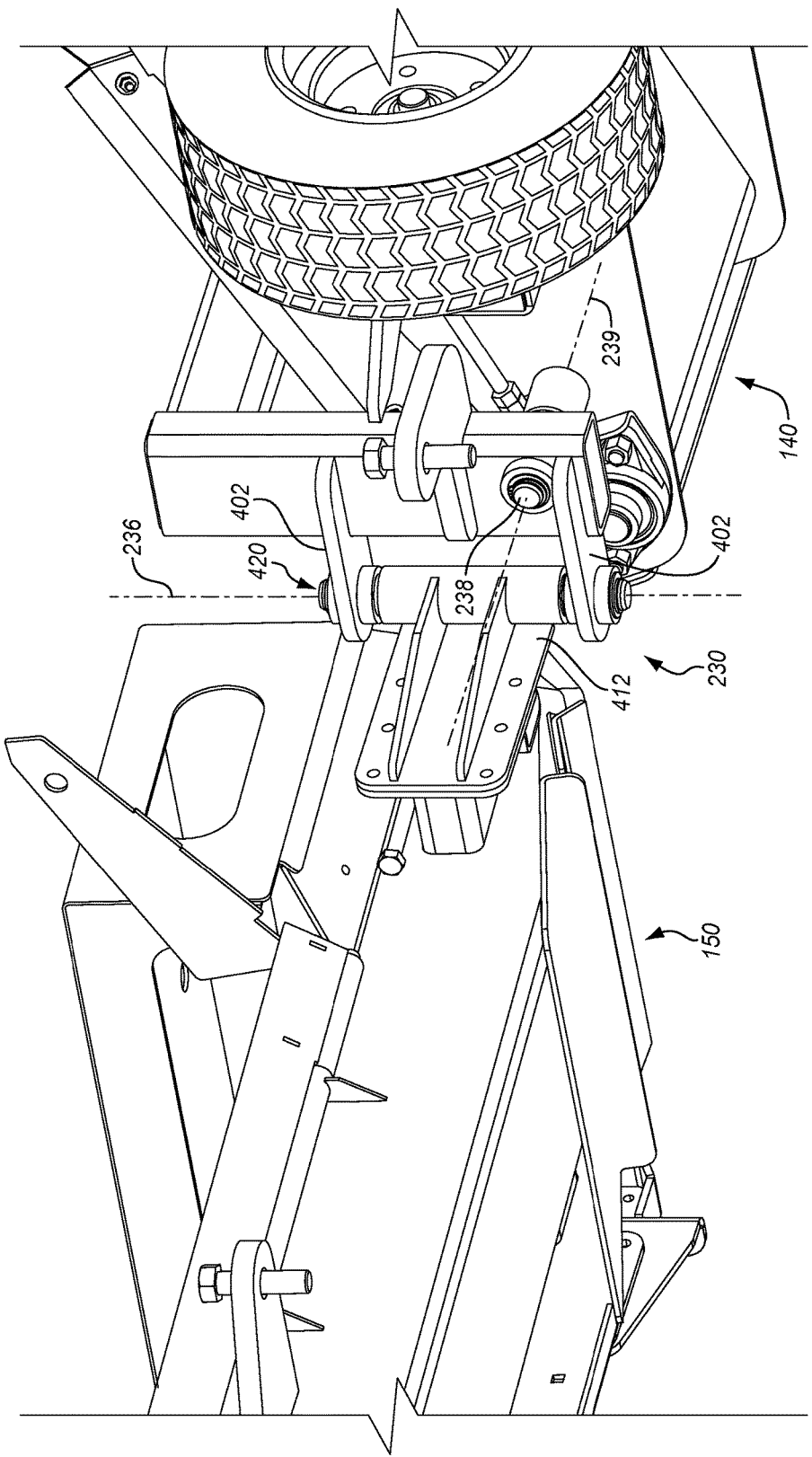
FIG. 4 illustrates a hinge mechanism in an exemplary embodiment.

FIG. 4 illustrates hinge mechanism 230 in an exemplary embodiment. In this embodiment, hinge mechanism 230 includes hinge members 402 that protrude from incline section 140. Likewise, hinge mechanism 230 includes a hinge member 412 that protrudes from intake section 150. A pin member 420 passes through holes in hinge members 402 and 412, which allows intake section 150 to pivot in relation to incline section 140 on axis 236. Hinge members 402 may connect to incline section 140 via pivot shaft 238. Pivot shaft 238 allows hinge mechanism 230 and intake section 150 to pivot in relation to incline section 140 on axis 239. Although pivot shaft 238 is shown through incline section 140, a similar type of pivot shaft may be installed on intake section 150 in another embodiment.

In FIG. 3, swing conveyor 130 may also include a hinge actuator 332 that connects between incline section 140 and intake section 150. Hinge actuator 332 is configured to extend and retract to pivot intake section 150 about axis 236 in relation to incline section 140. Hinge actuator 332 may comprise a hydraulic cylinder in one embodiment. Intake section 150 may also include one or more wheels 358 toward outer end 255, which means that wheels 358 attach to housing 250 or a frame of housing 250 near, proximate, or at outer end 255. Wheels 358 are passive in this embodiment, meaning that they are not independently driven. Wheels 358 may comprise swivel casters so that wheels 358 may swivel in relation to intake section 150. Movement of intake section 150 on wheels 358 may be powered by hinge actuator 332. Also, because hinge mechanism 230 may connect to incline section 140 via pivot shaft 238, wheels 358 of intake section 150 will maintain contact with the ground even when the ground is uneven. Further, swinging of intake section 150 on wheels 358 will not cause ground drive mechanism 304 of incline section 140 to lose traction with the ground. For example, if hinge mechanism 230 were rigidly connected to both incline section 140 and intake section 150 and intake section 150 were swung onto elevated ground, then this may cause ground drive mechanism 304 of incline section 140 to raise off the ground so that it could no longer pivot swing conveyor 130. Because pivot shaft 238 allows hinge mechanism 230 to pivot about a horizontal axis 239, ground drive mechanism 304 of incline section 140 maintains traction with the ground even if intake section 150 were swung onto elevated ground.

Intake section 150 may also include an actuator 352 that is configured to drive pulley 254 (not visible in FIG. 3), and control the speed at which belt 256 is driven for intake section 150. In this embodiment, belt 256 of intake section 150 is driven from outer end 255, which is distal from hinge mechanism 230. This is advantageous in that actuator 352 does not interfere with hinge mechanism 230 or hinge actuator 332. In this embodiment, belt 256 of intake section 150 is not mechanically-linked to belt 216 of incline section 140 to provide rotation of belt 256. Although they are not mechanically linked, actuator 352 may be hydraulically or fluidly linked to actuator 302 of incline section 140. For example, if actuator 352 of intake section 150 and actuator 302 of incline section 140 are hydraulic motors, then they may be plumbed in series so that hydraulic fluid flows from actuator 302 to actuator 352. The size of actuator 302 and the size of actuator 352 will control the rotational speed of their respective belts 216/256. Alternatively, actuator 352 of intake section 150 may be independent from actuator 302 of incline section 140. For example, a separate flow of hydraulic fluid may be supplied to each actuator 302/352, or a valve may be installed between actuator 302 and actuator 352 to supply a different hydraulic pressure to actuators 302/352. Even when hydraulically linked, actuator 352 may be driven at a different speed than actuator 302. For example, belt 216 of incline section 140 may be driven at a faster speed than belt 256 of intake section 150 to ensure that intake section 150 does not supply an excess amount of material to incline section 140.

Figure 5:
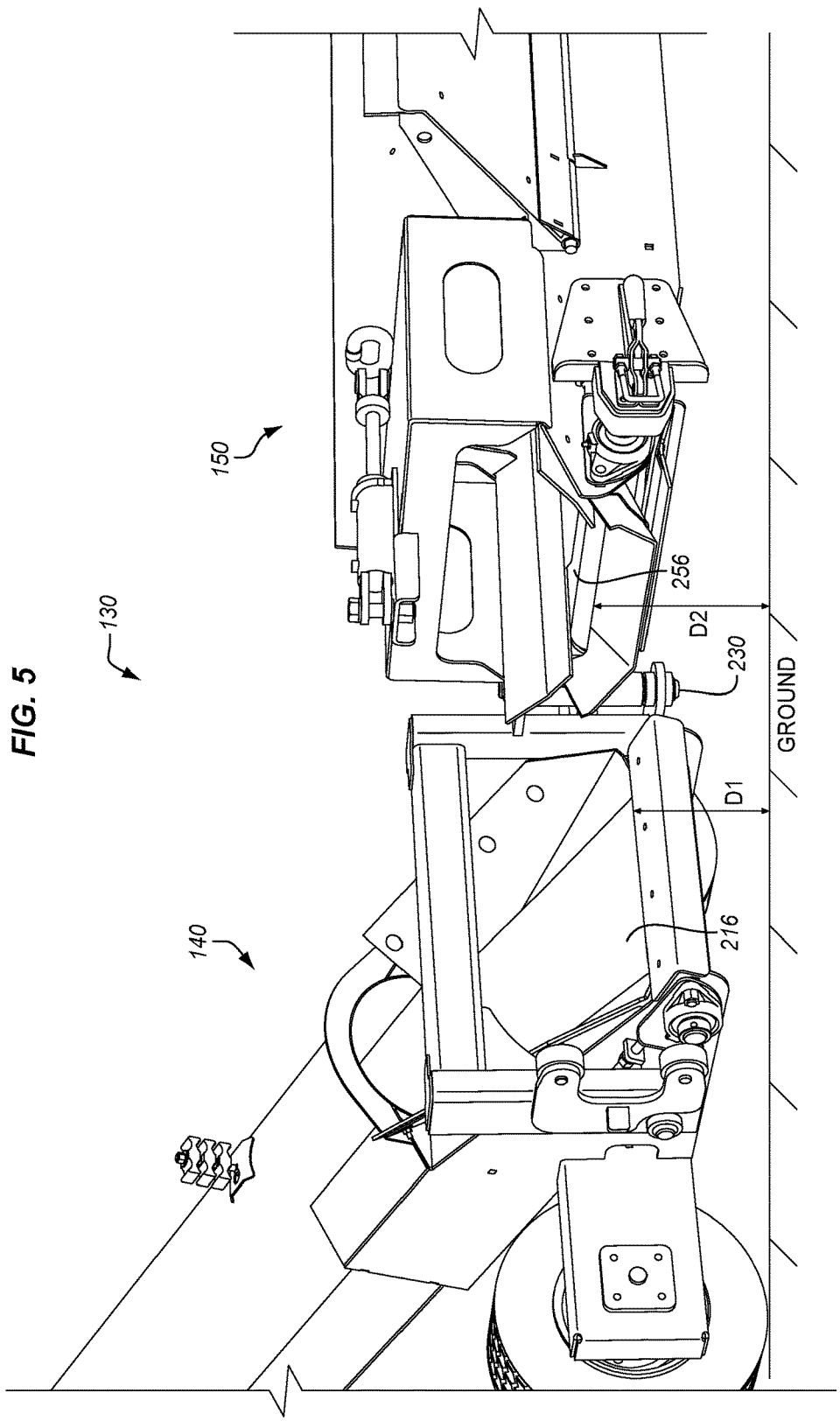
FIG. 5 is another isometric view of a swing conveyor in an exemplary embodiment.

FIG. 5 is another isometric view of swing conveyor 130 in an exemplary embodiment. As described above, intake section 150 is configured to supply a flow of material to incline section 140. To accomplish this, belt 256 of intake section 150 is elevated in relation to belt 216 of incline section 140 at the transition point between belt 256 and belt 216. The transition point is where the material transitions from belt 256 of intake section 150 to belt 216 of incline section 140. FIG. 5 illustrates belt 216 of incline section 140 being a distance D1 from the ground, and belt 256 of intake section 150 at a distance D2 from the ground. Because the distance D2 is greater than the distance D1, belt 256 does not contact belt 216 when swing conveyor 130 is unfolded, and belt 256 may actually overlap above belt 216 to dispense the material onto belt 216.

Figure 6:
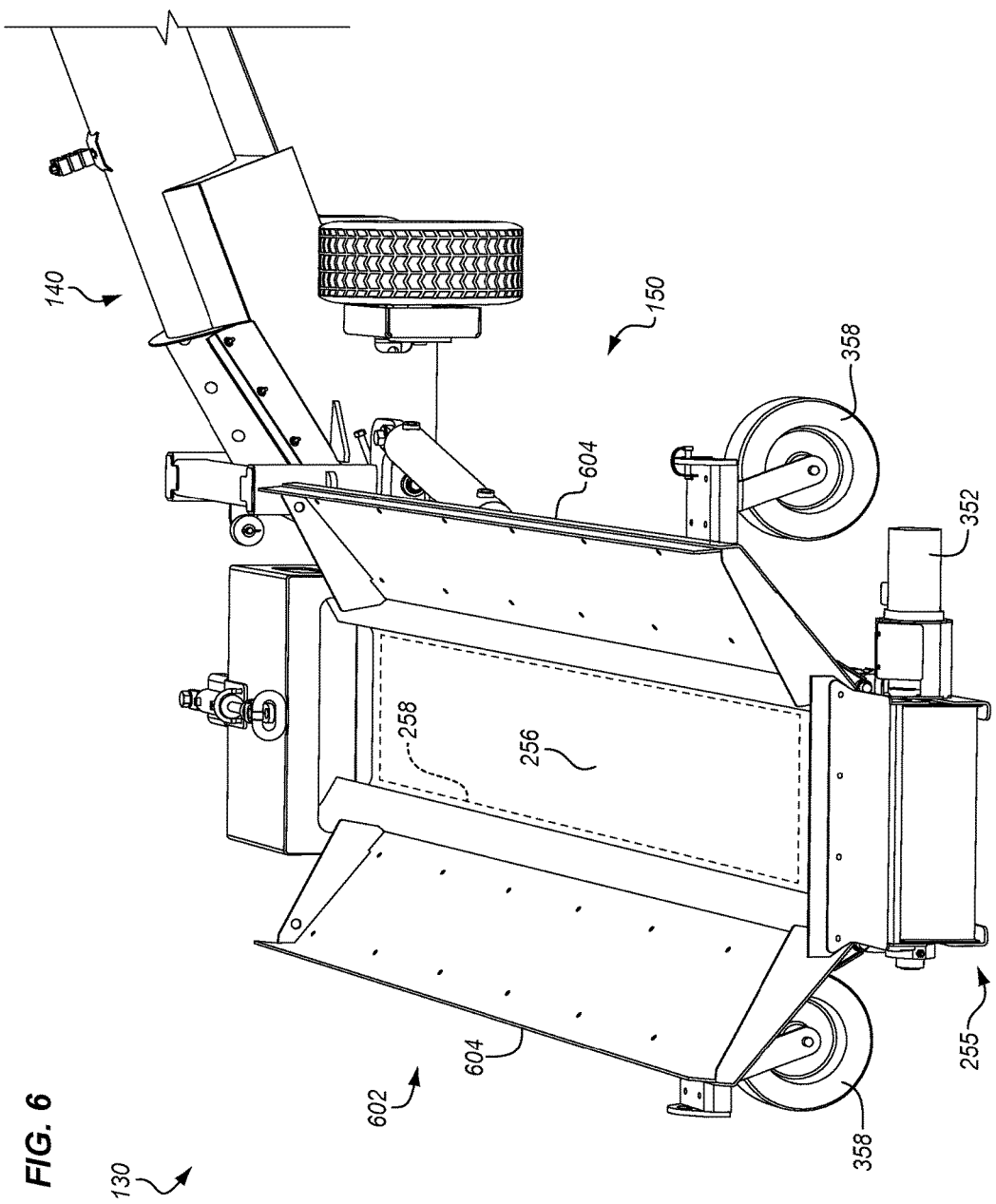
FIG. 6 is another isometric view of a swing conveyor in an exemplary embodiment.

FIG. 6 is another isometric view of swing conveyor 130 in an exemplary embodiment. In this embodiment, intake section 150 includes a collapsible hopper 602. Collapsible hopper 602 includes hopper walls 604 that surround or border intake area 258 of intake section 150 where material is dispensed onto belt 256. Hopper walls 604 are able to pivot downward when swing conveyor 130 is being moved, and are able to pivot upward when intake section 150 is receiving a flow of material from a truck or trailer to reduce the chance of spillage.

Figure 7:
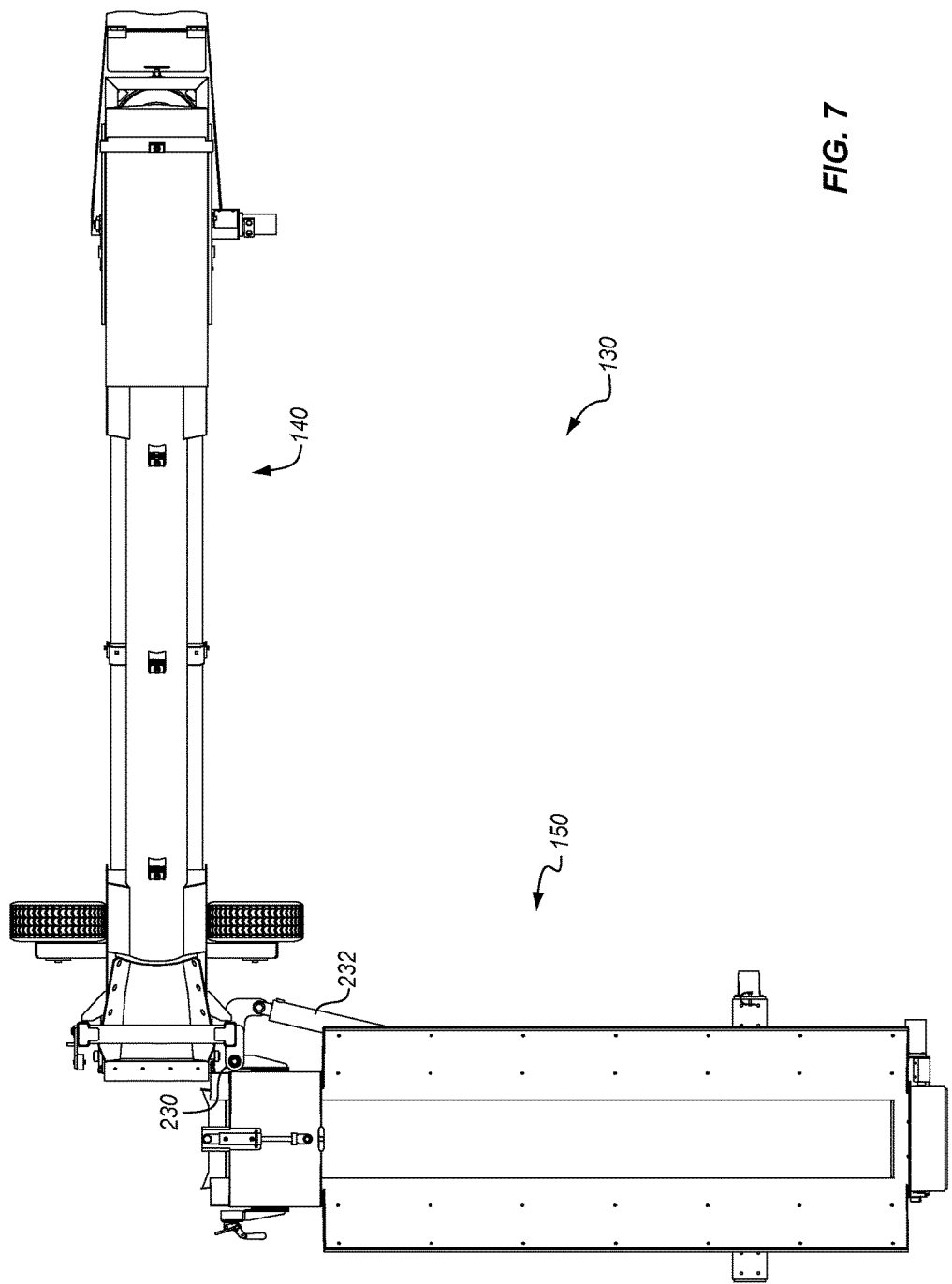
FIG. 7 is a top view of a swing conveyor in an exemplary embodiment.

FIG. 7 is a top view of swing conveyor 130 in an exemplary embodiment. In FIG. 7, swing conveyor 130 is "folded", which means that intake section 150 is pivoted towards or in the direction of incline section 140 on hinge mechanism 230. Thus, hinge actuator 232 is contracted to pivot intake section 150 towards incline section 140 on hinge mechanism 230. Hinge mechanism 230 may include some type of stop member to control how far intake section 150 can pivot towards incline section 140.

Figure 8:
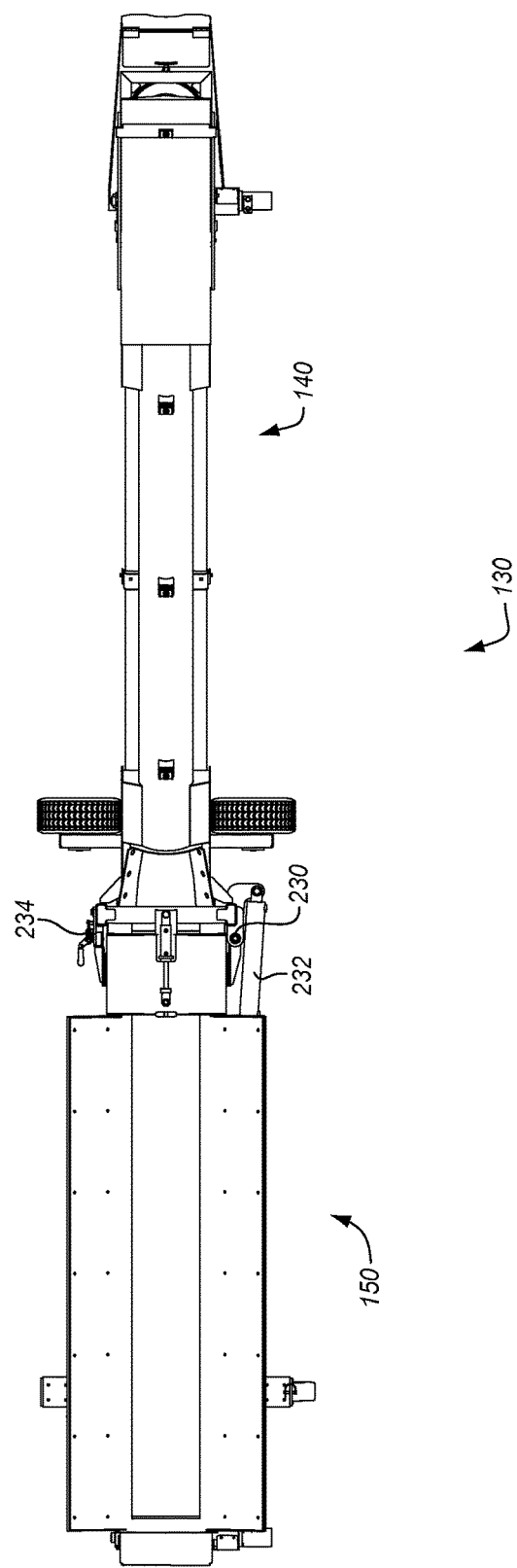
FIG. 8 is another top view of a swing conveyor in an exemplary embodiment.

FIG. 8 is a top view of swing conveyor 130 in an exemplary embodiment. In FIG. 8, swing conveyor 130 is "unfolded", which means that intake section 150 is pivoted away (i.e., in a direction away) from incline section 140 on hinge mechanism 230. Thus, hinge actuator 232 is extended to pivot intake section 150 away from incline section 140 on hinge mechanism 230. When swing conveyor 130 is unfolded, belt 256 of intake section 150 is substantially aligned with belt 216 of incline section 140.

FIGS. 9-12 illustrate an operation of conveyor apparatus 100 in an exemplary embodiment. One problem with traditional swing conveyors is that a user may not be able to rotate the swing conveyor under a trailer (or truck, grain cart, etc.) because the swing radius of the swing conveyor is too large. Thus, the trailer may have to be positioned to account for the swing radius of the swing conveyor, and then repositioned so that the swing conveyor can reach the discharge outlets of the trailer. Because swing conveyor 130 as described herein is segmented, it may be folded so that the swing radius is reduced to pivot underneath a trailer. When under the trailer, swing conveyor 130 may be unfolded so that it is long enough to reach multiple discharge units of the trailer without having to reposition the trailer.

Figure 9:
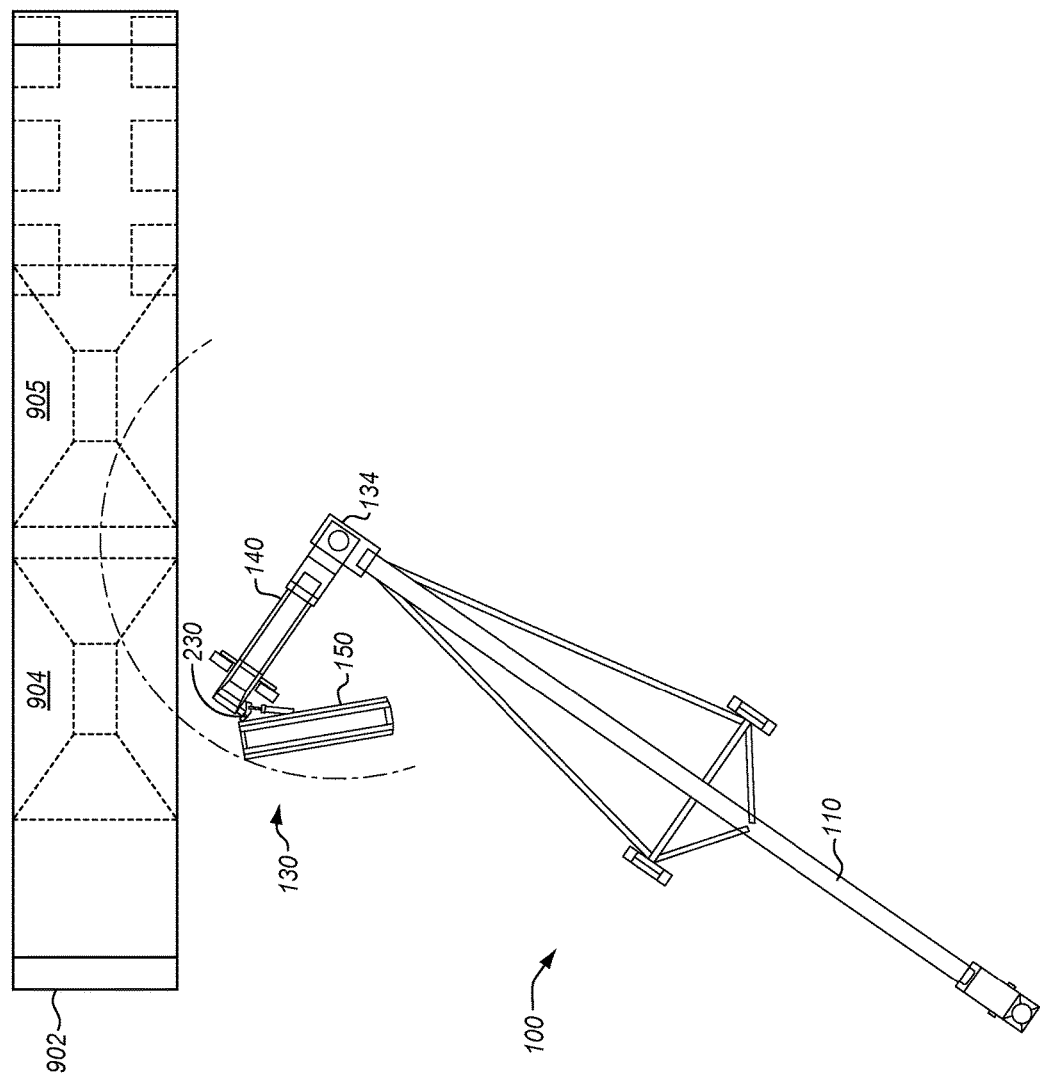
FIGS. 9-12 illustrate an operation of a conveyor apparatus in an exemplary embodiment.
Figure 10:
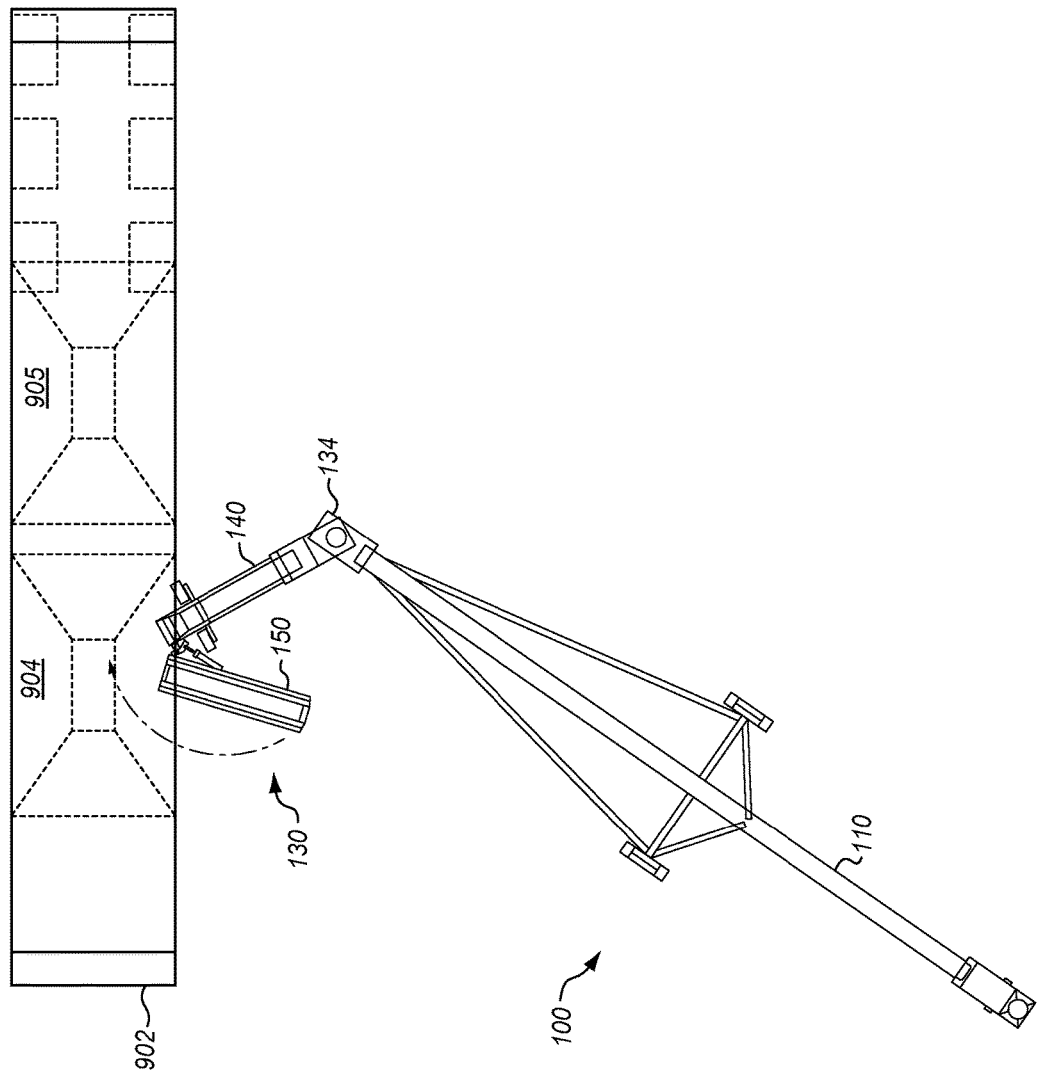
Figure 11:
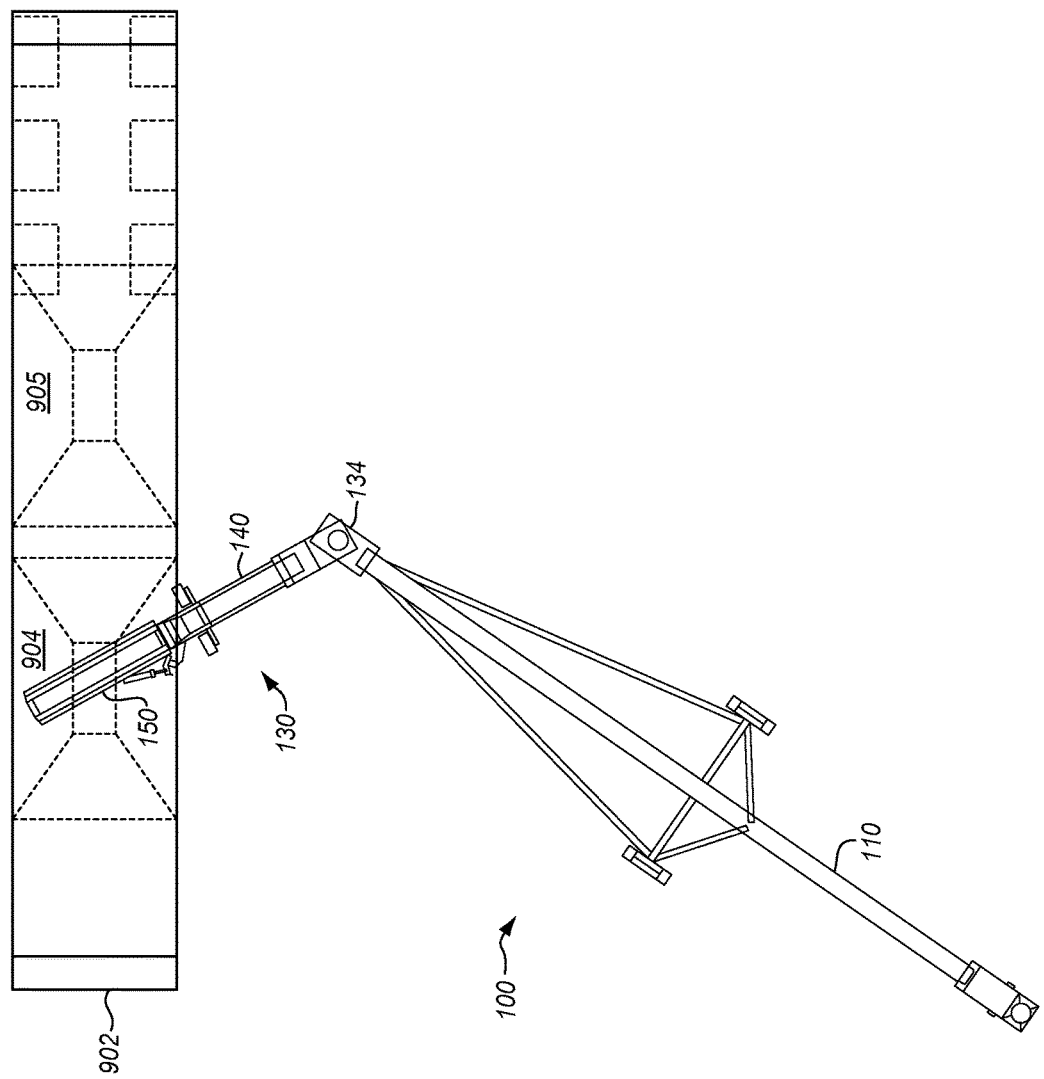
Figure 12:
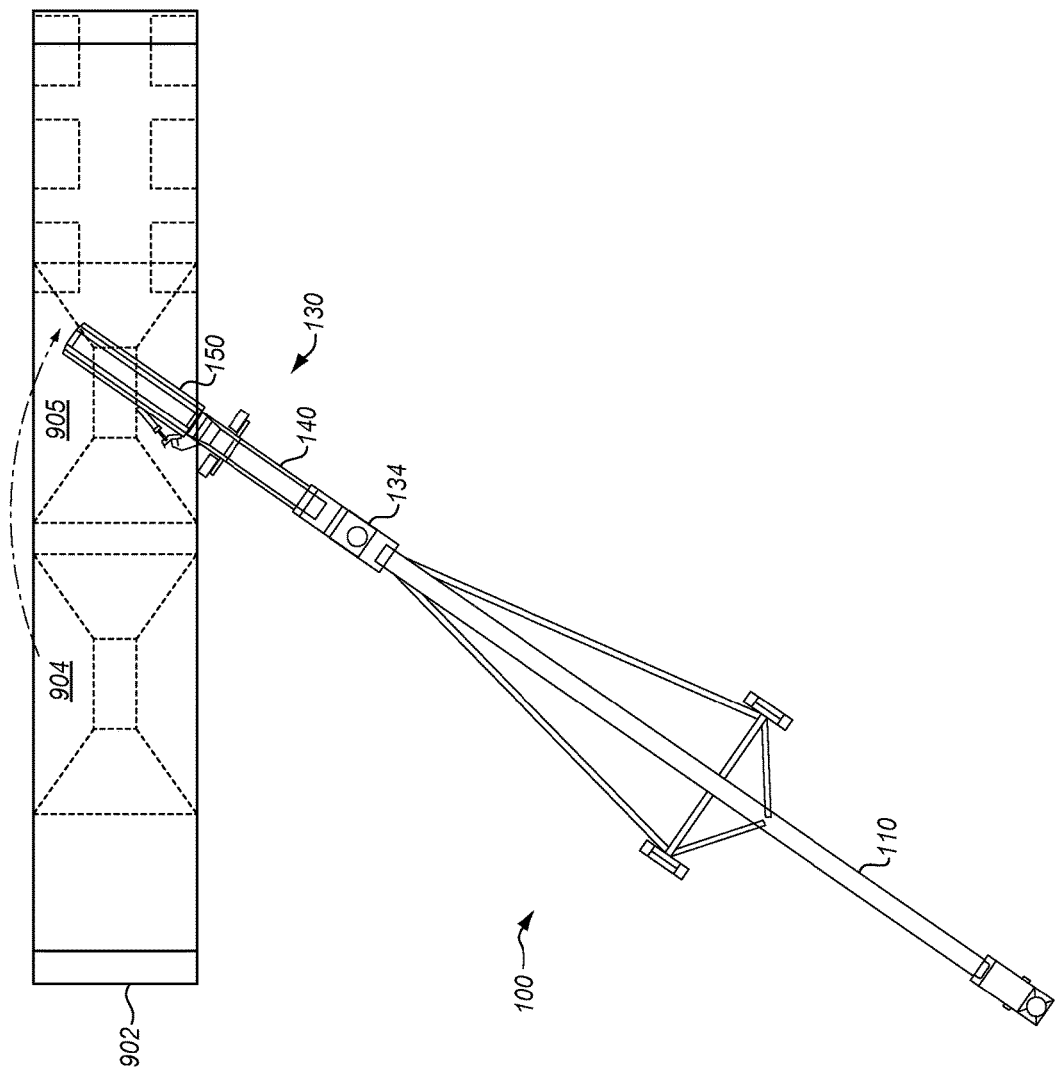

In FIG. 9, a trailer 902 with multiple hoppers 904-905 is parked next to conveyor apparatus 100. Swing conveyor 130 is initially folded so that intake section 150 is pivoted towards incline section 140. In FIG. 10, swing conveyor 130 is rotated via pivot mechanism 134 under trailer 902 while folded. In FIG. 11, swing conveyor 130 is unfolded so that intake section 150 is pivoted away from incline section 140 via hinge mechanism 230, and positioned under hopper 904 of trailer 902. Material stored in hopper 904 may then be discharged onto intake section 150, where swing conveyer 130 transfers the material to main conveyor 110. In FIG. 12, swing conveyor 130 may again be rotated via pivot mechanism 134 to be positioned under hopper 905 of trailer 902. Material stored in hopper 905 may then be discharged onto intake section 150, where swing conveyer 130 transfers the material to main conveyor 110. When unloading of trailer 902 is complete, swing conveyor 130 may again be folded so that intake section 150 is pivoted towards incline section 140 via hinge mechanism 230. Swing conveyor 130 may then be rotated via pivot mechanism 134 out from under trailer 902 while folded so that trailer 902 may be moved. As is evident in this example, swing conveyor 130 can effectively be rotated underneath trailer 902 and reach multiple hoppers 904-905 of trailer 902 without having to reposition trailer 902.

Although specific embodiments were described herein, the scope is not limited to those specific embodiments. Rather, the scope is defined by the following claims and any equivalents thereof.

What is claimed is:

1. A conveyor apparatus comprising:
   a swing conveyor comprising:
      an incline section that pivotally connects to an intake of a main conveyor, and includes a first belt; and
      an intake section that includes a second belt that receives a flow of material, and transfers the flow of material to the incline section;
      wherein the first belt of the incline section transfers the flow of material received from the intake section to the intake of the main conveyor;
      wherein the intake section connects to the incline section via a hinge mechanism so that the intake section pivots in relation to the incline section.

2. The conveyor apparatus of claim 1 wherein:
   the swing conveyor comprises:
      a hinge actuator connected between the incline section and the intake section;
      the hinge actuator is configured to pivot the intake section toward the incline section via the hinge mechanism to fold the swing conveyor; and the hinge actuator is configured to pivot the intake section away from the incline section via the hinge mechanism to unfold the swing conveyor.

3. The conveyor apparatus of claim 2 wherein:
the swing conveyor comprises a locking mechanism that secures the intake section to the incline section when the swing conveyor is unfolded.

4. The conveyor apparatus of claim 1 wherein:
the intake section includes collapsible walls that border an intake area where the intake section receives the flow of material via the second belt.

5. A conveyor apparatus comprising:
a swing conveyor comprising:
  an incline section that includes a first belt configured to rotate in a loop between an inlet end and an outlet end, wherein the outlet end of the incline section pivotally connects to an intake of a main conveyor so that the swing conveyor pivots about a first axis in relation to the main conveyor;
  an intake section that includes a second belt configured to rotate in a loop between an outer end and a transition end, wherein at least a portion of the second belt is exposed to form an intake area of the swing conveyor; and
  a hinge mechanism that connects the transition end of the intake section to the inlet end of the incline section so that the intake section pivots about a second axis in relation to the incline section.

6. The conveyor apparatus of claim 5 wherein:
the swing conveyor comprises:
  a hinge actuator connected between the incline section and the intake section;
  the hinge actuator is configured to pivot the intake section toward the incline section via the hinge mechanism to fold the swing conveyor; and
  the hinge actuator is configured to pivot the intake section away from the incline section via the hinge mechanism to unfold the swing conveyor.

7. The conveyor apparatus of claim 6 wherein:
the swing conveyor comprises a locking mechanism that secures the intake section to the incline section when the swing conveyor is unfolded.

8. The conveyor apparatus of claim 5 wherein:
the intake section includes a first actuator configured to drive the second belt from the outer end; and
the incline section includes a second actuator configured to drive the first belt from the outlet end.

9. The conveyor apparatus of claim 5 wherein:
the hinge mechanism connects to the incline section via a pivot shaft; and
the pivot shaft allows the hinge mechanism and the intake section to pivot about a third axis in relation to the incline section.

10. The conveyor apparatus of claim 5 wherein:
the second belt at the transition end of the intake section is elevated in relation to the first belt at the inlet end of the incline section.

11. The conveyor apparatus of claim 5 wherein:
the incline section includes a ground drive mechanism toward the inlet end that engages the ground; and
the intake section includes at least one wheel toward the outer end that engages the ground.

12. The conveyor apparatus of claim 11 wherein:
the ground drive mechanism includes at least one wheel that engages the ground, and an actuator configured to drive the at least one wheel of the ground drive mechanism.

13. The conveyor apparatus of claim 5 wherein:
the intake section includes collapsible walls that border the intake area of the swing conveyor.

14. A conveyor apparatus comprising:
a main conveyor having an intake and a discharge; and
a swing conveyor comprising:
  an incline section that includes:
    an inlet end;
    an outlet end that pivotally connects to the intake of the main conveyor so that the swing conveyor pivots about a first axis in relation to the main conveyor; and
    a first belt configured to rotate in a loop between the inlet end and the outlet end; and
  an intake section that includes:
    an outer end;
    a transition end that connects to the inlet end of the incline section via a hinge mechanism so that the intake section pivots about a second axis in relation to the incline section; and
    a second belt configured to rotate in a loop between the outer end and the transition end, with at least a portion of the second belt exposed to form an intake area of the swing conveyor.

15. The conveyor apparatus of claim 14 wherein:
the swing conveyor comprises:
  a hinge actuator connected between the incline section and the intake section;
  the hinge actuator is configured to pivot the intake section toward the incline section via the hinge mechanism to fold the swing conveyor; and
  the hinge actuator is configured to pivot the intake section away from the incline section via the hinge mechanism to unfold the swing conveyor.

16. The conveyor apparatus of claim 15 wherein:
the swing conveyor comprises a locking mechanism that secures the intake section to the incline section when the swing conveyor is unfolded.

17. The conveyor apparatus of claim 14 wherein:
the intake section includes a first actuator configured to drive the second belt from the outer end; and
the incline section includes a second actuator configured to drive the first belt from the outlet end.

18. The conveyor apparatus of claim 14 wherein:
the hinge mechanism connects to the incline section via a pivot shaft; and
the pivot shaft allows the hinge mechanism and the intake section to pivot about a third axis in relation to the incline section.

19. The conveyor apparatus of claim 14 wherein:
the incline section includes a ground drive mechanism toward the inlet end that engages the ground; and
the intake section includes at least one wheel toward the outer end that engages the ground.

20. The conveyor apparatus of claim 14 wherein:
the intake section includes collapsible walls that border the intake area of the swing conveyor.

* * * * *